(12) United States Patent
Seward

(10) Patent No.: US 11,544,227 B2
(45) Date of Patent: Jan. 3, 2023

(54) EMBEDDED REFERENCE OBJECT AND INTERACTION WITHIN A VISUAL COLLABORATION SYSTEM

(71) Applicant: T-Mobile USA, Inc., Bellevue, WA (US)

(72) Inventor: Shelby Seward, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 57 days.

(21) Appl. No.: 16/905,886

(22) Filed: Jun. 18, 2020

(65) Prior Publication Data

US 2021/0397585 A1  Dec. 23, 2021

(51) Int. Cl.
| | |
|---|---|
| *G06F 16/176* | (2019.01) |
| *G06F 40/197* | (2020.01) |
| *G06F 40/18* | (2020.01) |
| *G06F 3/0481* | (2022.01) |
| *G06F 16/178* | (2019.01) |
| *G06Q 10/10* | (2012.01) |
| *H04L 9/40* | (2022.01) |
| *G06Q 50/00* | (2012.01) |

(52) U.S. Cl.
CPC .......... *G06F 16/176* (2019.01); *G06F 3/0481* (2013.01); *G06F 16/178* (2019.01); *G06F 40/18* (2020.01); *G06F 40/197* (2020.01); *G06Q 10/101* (2013.01); *G06Q 10/103* (2013.01); *G06Q 10/109* (2013.01); *G06Q 50/01* (2013.01); *H04L 63/08* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 9,602,559 B1* | 3/2017 | Barros | H04L 65/1089 |
| 2003/0097640 A1 | 5/2003 | Abrams et al. | |
| 2003/0142143 A1* | 7/2003 | Brown | G06F 11/328 |
| | | | 345/440.2 |
| 2005/0066018 A1* | 3/2005 | Whittle | G06F 9/542 |
| | | | 709/223 |
| 2005/0138118 A1* | 6/2005 | Banatwala | G06Q 10/10 |
| | | | 709/204 |
| 2006/0095443 A1 | 5/2006 | Kumar et al. | |
| 2007/0186157 A1 | 8/2007 | Walker et al. | |

(Continued)

*Primary Examiner* — Howard Cortes
(74) *Attorney, Agent, or Firm* — Perkins Coie LLP

(57) ABSTRACT

Disclosed here is a visual collaboration software including multiple digital canvas and multiple tools enabling collaboration among multiple users by enabling creation and sharing of visual information including text and drawings. The visual collaboration software obtains from a second software, e.g., a project management software, a file or a portion of the file, and displays the file or the portion in one of the multiple digital canvases. In one embodiment, the visual collaboration software can enable the user to interact with the file obtained from the second software and can pass the modifications to the file to the second software. In another embodiment, the visual collaboration software can only display the file or the portion of the file in one of the multiple digital canvases, and an interaction between the user and the file has to be passed to the second software to compute to the effect of the interaction.

20 Claims, 8 Drawing Sheets

(56) References Cited

U.S. PATENT DOCUMENTS

| | | | |
|---|---|---|---|
| 2007/0211149 A1* | 9/2007 | Burtnyk | G06T 19/003 348/208.4 |
| 2008/0120628 A1* | 5/2008 | Liang | G06F 9/451 719/328 |
| 2009/0183107 A1* | 7/2009 | Matthews | G06F 3/048 715/781 |
| 2010/0257457 A1 | 10/2010 | De Goes et al. | |
| 2010/0313165 A1* | 12/2010 | Louch | G06F 9/451 715/792 |
| 2012/0023418 A1 | 1/2012 | Frields et al. | |
| 2012/0116835 A1 | 5/2012 | Pope et al. | |
| 2012/0284658 A1* | 11/2012 | Hirvonen | G06F 3/0488 715/779 |
| 2013/0061155 A1 | 3/2013 | Hon | |
| 2013/0191711 A1* | 7/2013 | Tashman | G06F 3/04883 715/252 |
| 2013/0212485 A1 | 8/2013 | Yankovich et al. | |
| 2013/0305163 A1* | 11/2013 | Farmer | G06F 9/54 715/748 |
| 2014/0281870 A1 | 9/2014 | Vogel et al. | |
| 2015/0286620 A1 | 10/2015 | Teslenko et al. | |
| 2015/0363094 A1 | 12/2015 | Stone et al. | |
| 2016/0378291 A1 | 12/2016 | Pokrzywka | |
| 2017/0212718 A1 | 7/2017 | Nelson et al. | |
| 2017/0214726 A1* | 7/2017 | Malatesha | G06F 3/1454 |
| 2018/0095938 A1 | 4/2018 | Monte | |
| 2018/0152407 A1* | 5/2018 | Soni | H04L 51/34 |
| 2018/0219923 A1 | 8/2018 | Berger et al. | |
| 2018/0307406 A1 | 10/2018 | Pokrzywka | |
| 2019/0138587 A1* | 5/2019 | Silk | G06F 40/18 |
| 2019/0266265 A1 | 8/2019 | Dontcheva et al. | |
| 2020/0005241 A1 | 1/2020 | Westwood | |
| 2020/0272324 A1* | 8/2020 | Chanda | H04L 41/22 |
| 2020/0371663 A1* | 11/2020 | Rubinstein | G06F 3/04817 |
| 2020/0401687 A1* | 12/2020 | Mak | G06T 19/006 |

* cited by examiner

EMBEDDED REFERENCE OBJECT AND INTERACTION WITHIN A VISUAL COLLABORATION SYSTEM

BACKGROUND

Today, remote work is becoming ubiquitous. The software tools enabling remote work currently include videoconferencing and screen sharing. However, these tools are cumbersome and difficult to use. They do not enable seamless collaboration among multiple users, and seamless sharing of data between the software tools enabling remote work and various other software packages.

DETAILED DESCRIPTION

Figure 1:
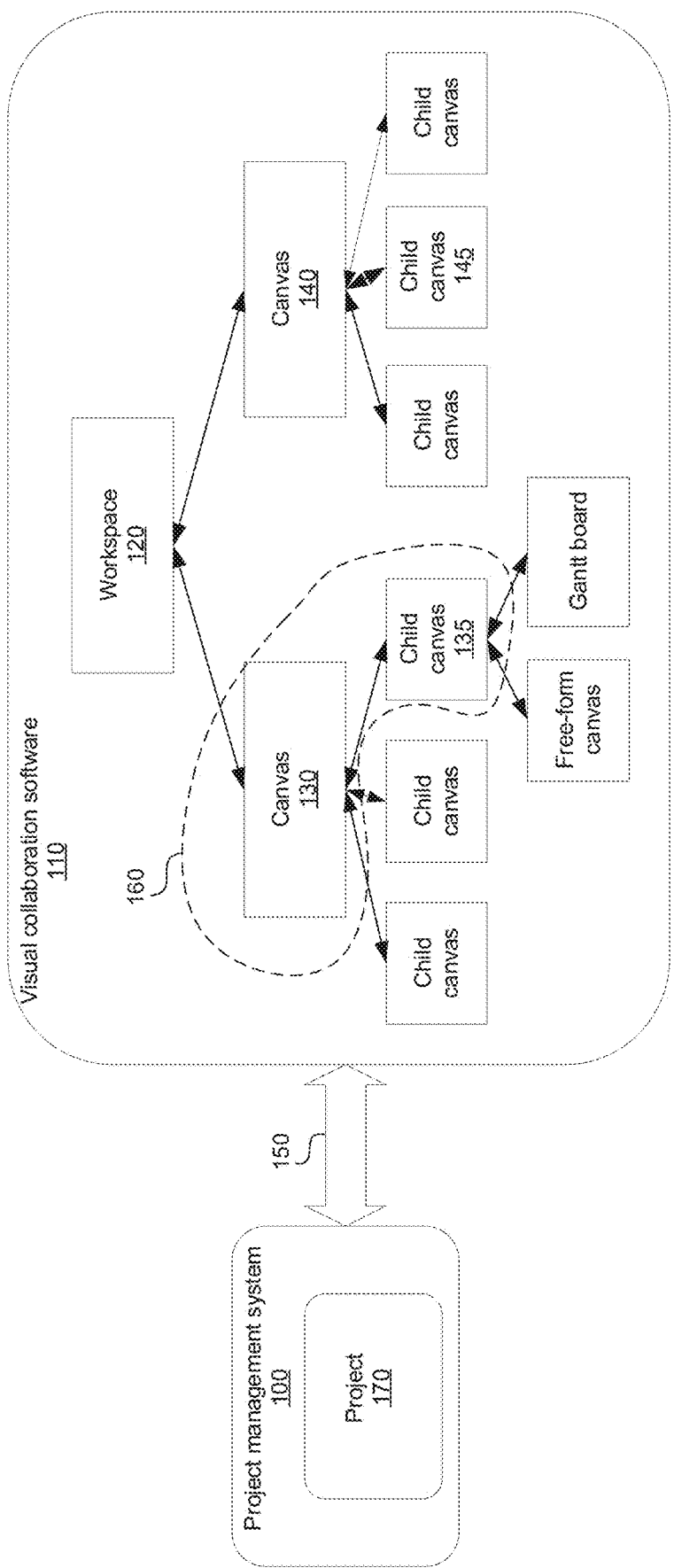
FIG. 1 shows communication between project management software and visual collaboration software.

Disclosed here is a visual collaboration software including a main digital canvas and multiple tools enabling collaboration among multiple users by enabling creation and sharing of visual information including text and drawings. The main digital canvas can include multiple child canvases. The visual collaboration software obtains from a reference software, e.g., a project management software, a chart representing a schedule of ordered tasks.

The project management software can store the chart in various formats such as Kanban boards, Gantt charts, program timelines, Sprint Backlogs and Sprint Schedule, calendars, and like systems for planning and measuring progress and/or tasks in a project. The project management software stores a first copy of the chart. The visual collaboration software can create a second copy of the chart in a child canvas and can receive from at least one user a modification to the second copy of the chart including a change in order of the ordered tasks, a change in a schedule of a task among the ordered tasks, and/or a drawing associated with the task. Upon receiving the modification, the visual collaboration software can automatically update the second copy of the chart in the child canvas and the first copy of the chart stored in the project management software, thereby synchronizing the first and second copies of the chart. Similarly, the project management software, upon modifying the first copy of the chart, can automatically propagate the change in the first copy to the second copy of the chart, thereby synchronizing the first and the second copies of the chart, regardless of where the change occurred.

The visual collaboration software can obtain, from the reference software, e.g., a second software, a portion of the file managed by the second software. The second software can be Microsoft Word, Excel, PowerPoint, an image processing software, etc. The visual collaboration software does not understand and does not manipulate the files managed by the second software; however, the visual collaboration software can display portions of the file in one of the child canvases. The visual collaboration software can represent the portion of the file managed by the second software using a computer code configured to invoke the second software. The computer code can be an embedded object reference. The computer code can include a URL or an inter-process communication (IPC) invocation.

The visual collaboration software can obtain a user input describing an interaction with the portion of the file, and can send the user input to the second software to compute an effect of the user input on the portion of the file. For example, the user input can be to edit a portion of a word processing document file or add an image to a PowerPoint slide deck file. To send the user input, the visual collaboration software executes the computer code to invoke the second software. The visual collaboration software can receive from the second software the effect of the user input on the portion of the file, and can display the effect of the user input on the portion of the file in the child canvas, without computing the effect of the user input by itself. Modifications to the portion of the file are sent to the second software, and vice versa, thereby synchronizing the content of the portion of the file between the visual collaboration software and the second software.

The visual collaboration software can be implemented on a mobile device with a small screen by allowing user interaction through hold and press gestures. Additionally, the visual collaboration software can reduce the number of canvases displayed on a small screen by collapsing the canvases that the user is not interacting with into icons. Further, the visual collaboration software can communicate with the second software, and/or the project management software, across a wireless telecommunication network.

FIG. 1 shows communication between a project management software 100 and a visual collaboration software 110. The term "program management" or "project management software" includes any program, project, sprint, design, workflow, and/or development management software unless otherwise noted. The project management software 100 can include information about a project such as Kanban boards, Gantt charts, program timelines, sprint backlog, sprint scheduling, calendars, and like systems for planning and measuring progress and/or tasks of a projects contained in the project management software 100, such as project 170.

The visual collaboration software 110 can include an "infinite" canvas organized into one or more workspaces 120 that can include multiple canvases 130, 140. Each of the multiple canvases 130, 140 can include child canvases 135, 145 (only two labeled for brevity). Each of the child canvases 135, 145 can be further subdivided and contain additional information about the project. The canvas 130, 135, 140, 145 can have a type specifying the function of the canvas, such as a Kanban board, Gantt chart, program timeline, free-form, etc. The free-form type canvas enables a user to brainstorm by, for example, drawing, writing, or importing objects from external software. The workspaces 120, and the canvases 130, 135, 140, 145 can contain memory pointers to each other. For example, the canvas 130 can point to the child canvas 135, and the child canvas 135 can point to the canvas 130. The child canvas 135 can have a child canvas, grandchild canvas, etc., where each child points to the parent and vice versa.

A single workspace 120 can be used for many different projects at the same time. Thus, a given project within a project management software 100 can be linked to a set of canvases 130, 135 within the workspace 120 within the visual collaboration system 110, enabling the user to see multiple workflows simultaneously on the same infinite visual collaboration workspace.

The communication link 150 between the project management software 100 and the visual collaboration software 110 is bidirectional. Any changes made to the data shared between the project management software 100 and the visual collaboration to 110 are communicated between the project management software and the visual collaboration software.

The visual collaboration software 110 can maintain a callback URL reference to the project management software 100 so that all updates to shared data can be sent to that callback URL. Alternatively or additionally, the communication link 150 can open a TCP socket, such as a WebSocket, so updates can be communicated over WebSocket to the project management software 100.

The project management software 100 can maintain the same type of URL for any callback or WebSocket towards the visual collaboration software 110 directed specifically to a canvas 130, 135, 140, 145 inside a workspace 120 in the visual collaboration system 110 or towards a project reference 160 bound to a unique set of canvases 130, 135 within the workspace 120 in the visual collaboration system.

Once the present system establishes the bidirectional communication link 150 via REST API and/or TCP socket is established, any change in the project management software 100 is reflected in the visual collaboration system 110, and vice versa. To enable the project management software 100 and the visual collaboration system 110 to modify the same files, a lock file or similar function can be kept by the software 100, 110 when updating any shared data.

Some data in the visual collaboration software 110, like brainstorming data, some notes, and action items, cannot be updated in the project management software 100, because the project management software 100 does not contain the type of data. Instead, the project management software 100 can include an interface that has access to the callback URL, access token, or a key of the visual collaboration software 110 that allows the project management software 100 to embed the visual collaboration software as a JSON- or XML-based reference. As a result, a user inside the project management software can interact with the visual collaboration software on a per task/step basis with the entire visual collaboration experience available. In another embodiment, the user can only view the linked work item, or the child canvas data only available via reference JSON/XML.

Child canvases 130, 135, 140, 145 can be available directly in the project management software 100 because the main canvas data can be redundant to the data contained in the project management software. All data referenced by the workspace 120 can be queried by an external system via a RESTful API with JSON- or XML-based data formats including but not limited to unique canvas identifiers, child canvas identifiers, names of canvases and child canvases, allowed users, and direct links to all content in a workspace.

During the course of a new project setup or during use of an existing project 170, the project management software 100 can require or give an option to a user to add a link between a given project 170 in the project management software 100 and a visual collaboration software 110. The workspace 120 can be common to the entirety of the project 170, or various stages of the project can be mapped to various workspaces inside of the visual collaboration software 110.

Figure 2:
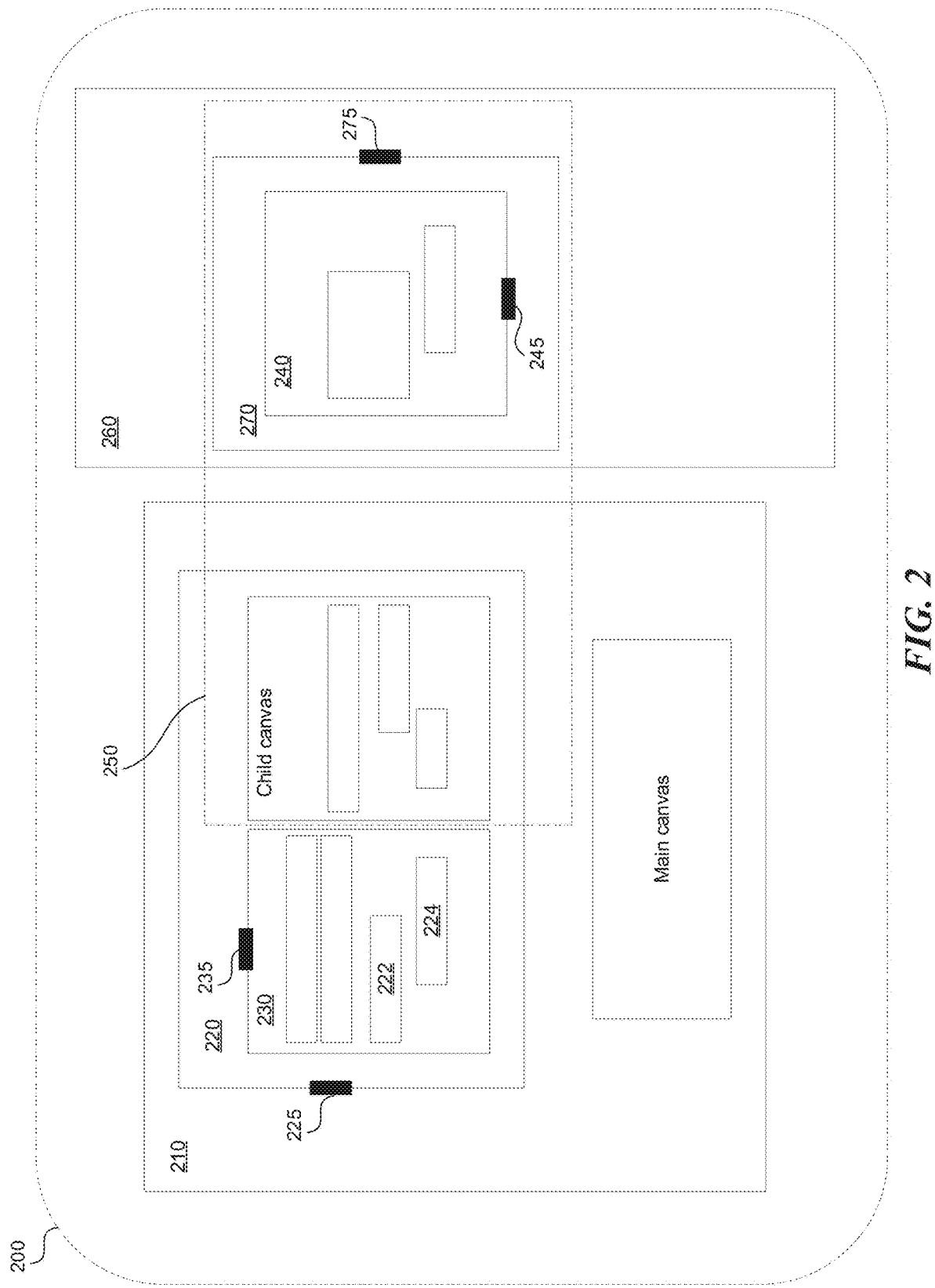
FIG. 2 shows contents of an infinite canvas.

FIG. 2 shows contents of an infinite canvas 200. The infinite canvas 200 can include a workspace 210, 260 main canvas 220, 270 (only two labeled for brevity) and child canvases 230, 240 (only two labeled for brevity).

Prior to first use, a database or configuration file can contain a set of rules that define the workspace 210, 260 creation. The set of rules can include a template with a hard-set configuration for the workspace 210, 260 such as the X,Y coordinates on a Cartesian plane for each canvas or group of content.

Each canvas 220, 230, 240, 270 has a unique identifier (ID). Each project 170 in FIG. 1 also has a unique ID. A bounding box 250 can define an area containing multiple canvases across multiple workspaces 210, 260 that can be shown and worked on, in the workspace 210, 260. The unique ID's of the canvases contained in the bounding box 250 can be linked to the unique ID of the project 170 identifier so that data can be synchronized between the project management software 100 in FIG. 1 and the visual collaboration software 110 in FIG. 1. Alternatively, the workspace 210, 260 as a whole can be mapped to the unique ID of the project 170.

To keep data between the project management software 100 and the visual collaboration software 110 synchronized, the workspace 210, 260 is uniquely linked to the unique ID of the project 170 or to a bounding box 250 that is within or overlaps the workspace 210, 260. The visual collaboration software 110 keeps an order among the canvases 220, 230, 240, 270. In one embodiment, each canvas has a sequence ID indicating the place of the canvas 220, 230, 240, 270 in the ordering. This sequence ID can be updated over time as the order of the canvases 220, 230, 240, 270 changes. Alternatively, the ordering of the canvases 220, 230, 240, 270 can be obtained from the canvases' 220, 230, 240, 270 memory pointers. By rearranging the pointers, the ordering of the canvases can be changed. In that case, the unique ID of the canvas does not need to be updated when the place of the canvas within the canvas ordering changes.

For example, the canvases 220, 230, 240, 270 can be arranged in a linked list. Changing the pointers in the linked list changes the order of the linked list. In another example, the canvases 220, 230, 240, 270 can be hierarchically arranged, as shown in FIG. 1. If the left child canvas is considered first canvas in the order, rearranging the pointer of the left and right child canvas, rearranges the order of the canvases 220, 230, 240, 270. If the order between canvases is not known, the visual collaboration software 110 can ask the user to specify the order between the canvases.

Each canvas 220, 230, 240, 270 can contain multiple connectivity points 225, 235, 245, 275 to allow visual connections to be made that represent connectivity in terms of time or dependencies among canvases 220, 230, 240, 270. There can be a set amount of default connectivity points per canvas, such as one per side, but more can be added by touching on the edge of the canvas or holding and adding a point via a menu option.

Within a canvas, the user can move tiles 222, 224 (only two labeled for brevity) representing tasks, bugs, stories, thus affecting the priority of the tile. The user can edit any field data transferred from the project management software 100, or add a new custom field, thus subsequently creating a new field in the project management software. The user can add and link to the unique canvas ID, a child canvas and any other identified canvas group.

The user can perform various interactions with the child canvas 230, 240. The user can maximize the canvas 230 which can overlay other canvases 240 or other content in the workspace 210, 260. The maximized canvas 230 can indicate to the user that it can be minimized. The user can minimize the canvas to an icon indicating to the user that the canvas 230 can be maximized again. All content associated with the child canvas 230, 240 can collapse or expand so the user can focus on the parent canvas or another child canvas.

The visual collaboration software 110 can expose a REST API that allows an authenticated user, or a guest user, the ability to open a workspace and directly center the workspace on the X,Y Cartesian coordinates of a given canvas unique identifier. The guest user can be allowed to access the visual collaboration software 110 while another authenticated user is attached to the workspace, for a period of time set by an authenticated user, or while an authorized event is ongoing such as a conference event in the workspace 210, 260. The visual collaboration software 110 can maintain unique optional and permanent links for guest users and authenticated users, respectively.

The visual collaboration software 110 can coordinate with third-party systems, such as external applications or external authentication software, to permit access to content in the visual collaboration software 110. The user can choose the identity to login to the visual collaboration system such as an identity created within the visual collaboration software or a third-party tool such as single sign-on SAML/OpenID/ OAuth credentials. An API key, OAuth Access Token, or equivalent can be stored along with the unique canvas ID in a database to manage access to the visual collaboration software content.

The visual collaboration software 110 can allow the external application to add/remove users for a given workspace 210, 260, to create a new workspace, to query existing workspaces, to query all canvas unique ID information and/or current users, and to allow updates via RESTful API.

After any user addition to the project 170 in FIG. 1, the project management software 100 can call the visual collaboration software 110 to allow an authorized user access to the workspace 210, 260 via RESTful API from the project management software 100. Furthermore, if a user is added in the visual collaboration software 110, the system can alert the project management software 100, via a RESTful API, that the user can be authorized to access the project 170 in the project management software 100.

Optionally, if a project 170 is imported into a workspace 210, the set of canvases identified as attached to the workspace 210 are allowed to be accessed by any user authorized in the project management software as having access to the project 170. The users having access to the project 170 do not have access to data/canvases in workspace 260 that is not associated with the imported project. To enable access of the users having access to the project 170, the visual collaboration software 110 can query the project management software 100 for the set of authorized users, ignoring the authorization specified by the local user database for the workspace 210.

Figure 3:
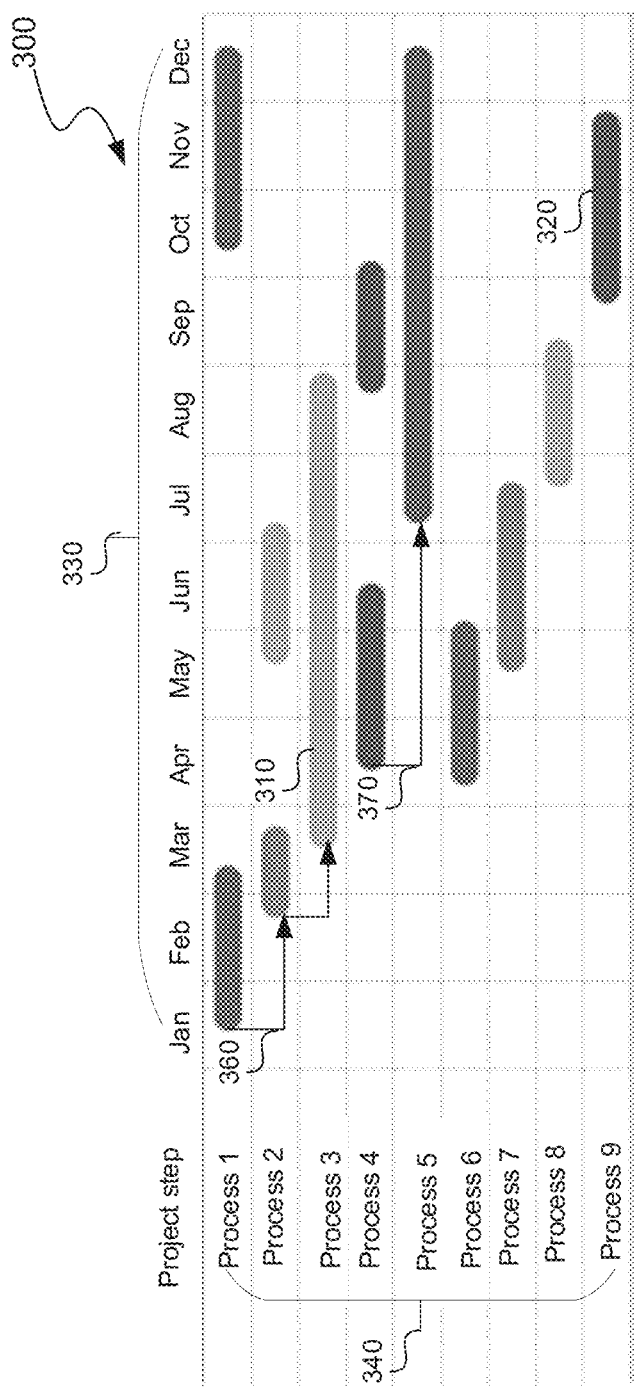
FIG. 3 shows a Gantt chart representing a project.

FIG. 3 shows a Gantt chart representing a project. The Gantt chart 300 includes steps 310, 320 (only two labeled for brevity), timeline 330, activities 340, priorities that are implied in the ordering of the activities 340. A user can change dependencies amongst steps in the chart, change timelines, setup parallel activities, add/remove steps of the chart, change priorities, etc. The chart 300 can be the sole project in a workspace 210, 260 in FIG. 2, or one of many projects attached to a bounding box 250 in FIG. 2 of canvases in a given workspace.

The Gantt chart 300 can show single or multiple connections 360, 370 (only 2 labeled for brevity) between each subsequent step in the chart. The Gantt chart 300 can show the activities 340 in parallel. One or more steps 310, 320 among the various activities 340 can be assigned to one or more canvases. The color coding of the steps 310, 320 can indicate a canvas to which each of the steps belongs.

The user can interact with the Gantt chart 300 to move a portion of the Gantt chart, such as one or more activities 340, to another canvas by touching and holding the activities 340 and/or via clicking and dragging. The user can specify the order of two canvases 230, 240 in FIG. 2, by touching and holding on an existing unused connection 235 in FIG. 2 to create an arrow to another canvas 240. Alternatively, a click and drag of a mouse can perform the same action.

If the user touches and holds a connection line 280 in FIG. 2 between two canvases, the visual collaboration software 110 in FIG. 1 can offer a menu of options to the user, such as:

a. Change a direction of the connection arrows between two canvases
b. Change line weight, compound type, dash type, cap type, join type, begin arrow type and size, end arrow type and size
c. Add text to describe the linkage between two canvases. This connection point data can be stored in a local database outside the project management software 100 in FIG. 1.

Figure 4:
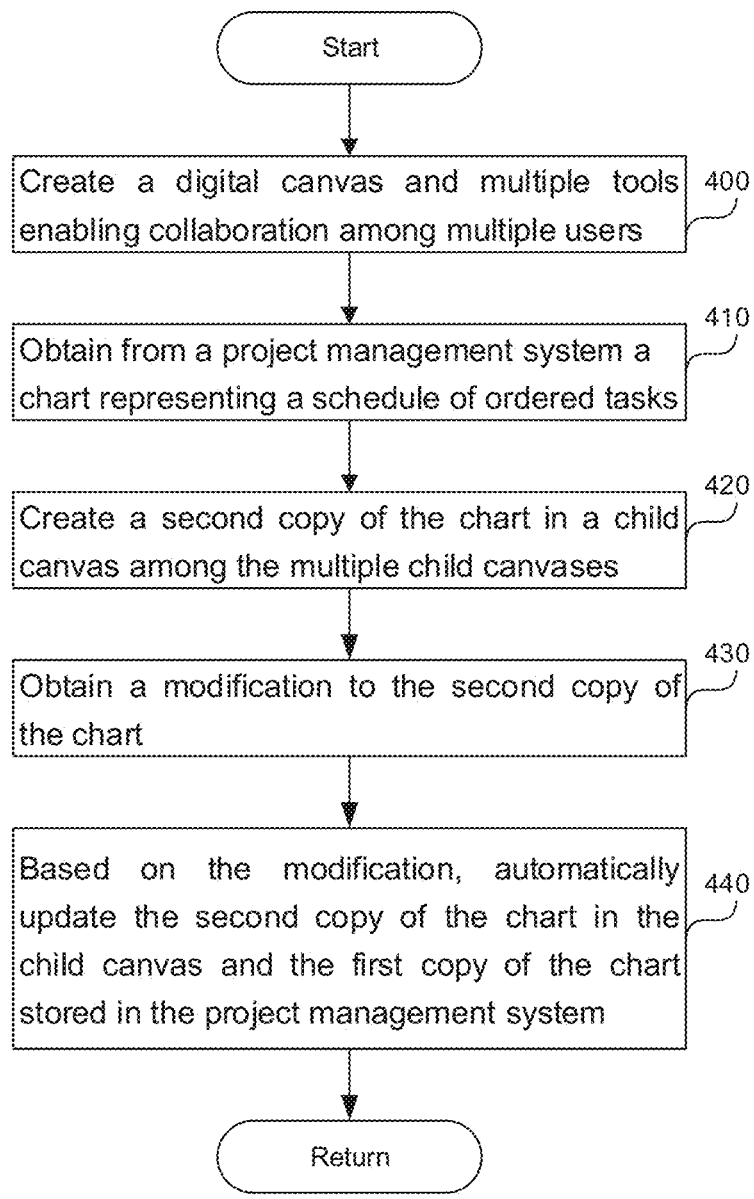
FIG. 4 is a flowchart of a method to enable collaboration between a project management software and a visual collaboration software.

FIG. 4 is a flowchart of a method to enable collaboration between a project management software and a visual collaboration software. In step 400, a hardware or a software processor can create a main digital canvas and multiple tools enabling collaboration among multiple users by enabling creation and sharing of visual information including text and drawings among the multiple users. The digital canvas, created by the visual collaboration software, can have an unlimited number of child canvases. The digital canvas can be infinite.

In step 410, the processor can obtain from a project management software a chart representing a schedule of ordered tasks and a callback reference to the project management software. The callback reference can include a callback URL, or a TCP socket, such as a WebSocket, so updates can be communicated over WebSocket to the project management software 100. The project management software stores a first copy of the chart. In step 420, the processor can create a second copy of the chart in a child canvas among the multiple child canvases.

In step 430, the processor can obtain from at least one user among the multiple users, a modification to the second copy of the chart including a change in order of the ordered tasks, a change in a schedule of a task among the ordered tasks, an addition of a task, a deletion of a task, etc.

In step 440, based on the modification, the processor can automatically update the second copy of the chart in the child canvas and the first copy of the chart stored in the project management software, thereby synchronizing the first copy and the second copy of the chart. The processor can make the update by making the call back reference to the project management software, where the call back reference includes the modification to the second copy of the chart. Alternatively, the processor can receive a modification to the first copy of the chart, where the modification was made by the project management software, and automatically propagate the modification to the second copy of the chart stored in the visual collaboration software.

The visual collaboration software can have multiple levels of child canvases. For example, the processor can create a second level child canvas, where the second level child canvas is a child of a child canvas among the multiple child canvases. The processor can obtain, from the user, visual information regarding the chart, and can store the visual information in the second level child canvas. The visual information regarding the chart can include modifications to the chart such as text, image, video, etc. A child canvas can be tied to a particular task in the parent canvas. For example, the child canvas can provide additional details about the task in the parent canvas, such as brainstorming notes.

In another example, a project can have multiple steps. In that instance, a base canvas can be created, such as a main canvas, for the project, and each of the steps can be represented in a separate child canvas. In addition, each child canvas can have one or more designated areas, where additional information for each of the project steps can be added. The designated areas can be free-form areas or functional areas such as a spreadsheet area, a code development area, a word-processor area, an image editing tool, etc.

The processor, upon user request, can retrieve and provide various information regarding the canvases stored in the visual collaboration software. For example, the processor can receive a request to retrieve a chart, or a particular sequence ID or unique ID associated with a canvas. The processor can display the requested information to the user, such as by displaying to the user child canvases among the multiple child canvases populated with the visual information.

The processor can rearrange the order of canvases in a sequence. In one example, the processor can keep track of the order of the canvases by assigning a sequence ID to each canvas, such as 1, 2, 3. Upon rearranging canvases, the sequence ID of the canvas has to be changed. In another embodiment, the order of the canvases can be derived from memory pointers, e.g., links between canvases. For example, a sequence of canvases can be obtained from a linked list of canvases, where each canvas in the sequence points to a subsequent canvas in the sequence. Similarly, the canvases can be ordered in a hierarchical structure, where a parent canvas points to child canvases. The order of the canvases is established by, for example, ordering the parent canvases before child canvases, and ordering the child canvases from right to left.

To establish the ordering of the canvases using links, the processor can obtain from a user, visual information regarding a task represented by the chart. The processor can create a first child canvas containing the visual information regarding a first task and a second child canvas containing the visual information regarding a second task. The processor can create a first link between the first task and the first child canvas, and a second link between the second task and the second child canvas. The processor can receive an instruction to change the order of the first and the second task. Upon receiving an instruction, the processor can automatically reorder the first and the second child canvas using the first and second links, by reordering the first and second tasks.

The processor can keep a history of modifications occurring in the visual collaboration software, to enable the user to view prior versions of canvases. For example, the processor can order the modifications to the second copy of the chart by time to create an ordered list of modifications. The processor can enable the user to view the modification in the ordered list of modifications and a version of the chart corresponding to the modification, where the viewed modification is not a latest modification in the ordered list of modifications.

The processor can enable easy, single-click sharing between the project management software and the visual collaboration software. The processor can create a share button within the project management software to enable single-click sharing of the chart with the child canvas. The processor can display the share button even on a small screen such as a screen of a mobile device. The processor can also display the share button on a web device, desktop device, wall device, etc.

Figure 5:
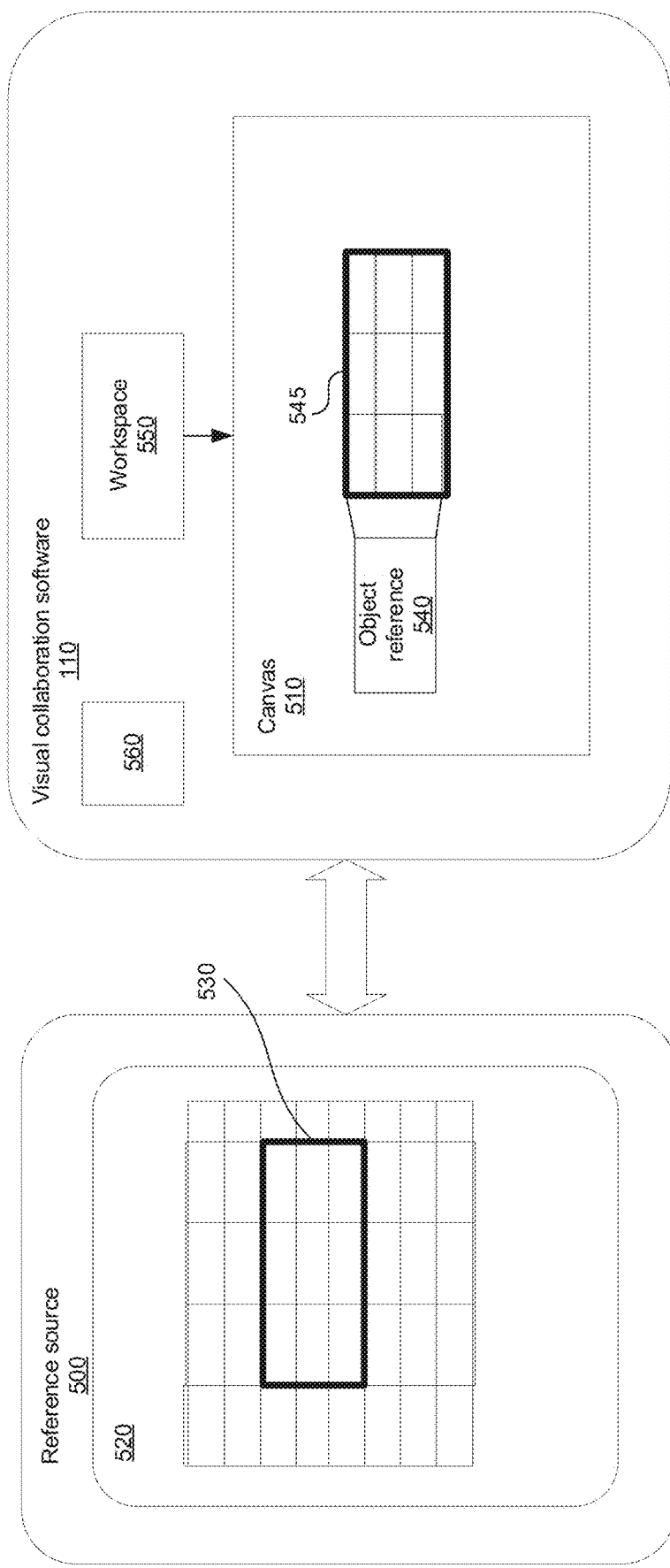
FIG. 5 shows sharing of an embedded object reference between a remote reference source and the visual collaboration software.

FIG. 5 shows sharing of an embedded object reference between a remote reference source and the visual collaboration software. The remote reference source 500 can be a second software providing functionality that the visual collaboration software 110 does not provide. For example, the second software 500 can be a spreadsheet, a word-processing software, an image editor, a video editor, a sound editor, a presentation software, etc.

The visual collaboration software 110 does not need to have any of the functionality of the second software 500; however, the visual collaboration software 110 can display at least a portion of an object represented by the second software 500 in a canvas 510.

For example, the second software 500 can be a spreadsheet software representing a native document 520, such as a spreadsheet 520. The native document 520 can be a Word document, a spreadsheet, a slide presentation, an audio file, an image, a video file, a file containing geometric description, etc. The user can select a portion 530 of the spreadsheet 520, where the portion contains one or more cells of the spreadsheet. The visual collaboration software 110 can only display the portion 530 in a canvas 510 because the visual collaboration software does not have the functionality to interact with the spreadsheet 520 or the portion of the spreadsheet. Consequently, the visual collaboration software 110 creates an embedded object reference 540 to the portion 530. Any interaction between a user and the object reference 540 is passed to the second software 500 to determine the result of the interaction. Upon determining the result of the interaction, the second software 500 passes the updated portion 530 to the visual collaboration software 110.

The object reference 540 can include a type of object 520, such as spreadsheet, image, Word document, slide, audio, video; identification of the portion 530 that is being shared, such as coordinates of cells if the object 520 is a spreadsheet; and an address for the second software 500 that is providing the interaction with the portion 530 of the object 520. The address of the second software can be a URL, if the second software is running on a remote processor. The object reference 540, for example, can be base-64 encoded and/or can be URL-encoded. The address of the second software can be the ID of the second software used in inter-process communication, if the second software is running on a local processor.

If the second software 500 is running on a remote processor, the object reference 540 can use an iFrame reference to an online presentation file, document, spreadsheet, project management tool, notetaking tool, or like collaboration tool. For example, the object reference 540 can be:
<iframe src='https://view.officeapps.live.com/op/embed.aspx?src=specify path here'width='100%'height='565px'frameborder='0'></iframe>

When the object reference 540 is interpreted by the visual collaboration software 110, the object 545 is displayed in canvas 510. The object reference 540 can also contain, instead of an IFrame reference, a full URL, JSON/XML body or a function call. The visual collaboration software 110 and/or the second software 500 can offer to the user to select how to embed the object reference 540, whether using a full URL, JSON/XML object, or IFrame.

A workspace 550 can store an unlimited number of object references 540. If an object 545 represented by the object reference 540 was placed into a new workspace, the default placement for the object can be at the 0,0 Cartesian coordinates.

The object reference 540 data such as JSON object, XML, or other ASCII-formatted objects, can be stored in its entirety in the metadata system used to store workspace spatial event map data. A spatial event map is a set of events occurring in the workspace and/or canvas. In other words, the spatial event map is an event log of all work done in the Cartesian plane of the workspace. The visual collaboration software 110 can create a unique ID for the object reference 540 and the following data can be stored with the unique identifier created for the object reference:

Organization identifier
Workspace unique identifier
Attached canvas unique identifier
Current Cartesian coordinates of the object reference (at least 2 are necessary but can store up to 4)
Friendly name of the object reference
Transparency level for the object reference set between 0% and 100%
Child canvases that might be linked to the object data for reference, note-taking, and/or brainstorming
User identifier that attached the object reference.

To monitor updates to the portion 530 of the object 520 made by the second software 500, the visual collaboration software 110 can include an http-based listener or event handler 560. For example, when the object 520 is marked as deleted or removed by the second software 500, the HTTP-based listener event handler 560 can receive a notification from the second software 500. Upon receiving the notification, the visual collaboration software 110 can mark the object reference 540 as unavailable.

In addition to or instead of the http-based listener or event handler 560, the second software 500 and the visual collaboration software 110 can communicate using a REST API query or publish/subscribe (pub/sub) messaging. Pub/sub messaging is a form of asynchronous service-to-service communication used in serverless and microservices architectures. In a pub/sub model, any message published to a topic is immediately received by all of the subscribers to the topic. For example, upon loading of the workspace 550, the processor can check any published messages or can send a REST API query to the second software 500 to determine whether there is a modification to the object reference 540, such as to confirm its existence or lack thereof. The second software 500 and the visual collaboration software 110 can communicate with each other using HTTP or WebSocket protocol.

When loading the object reference 540, the visual collaboration software 110 reads all the parameters referenced in the object reference 540, such as canvas to which the object belongs to, size, placement, information contained in the object reference 540, and displays the object 545 at the appropriate scale on the Cartesian plane, if the object 545 is currently in view on the viewing device.

The visual collaboration software 110, upon loading the object reference 540, can create any necessary WebSocket for the referenced object or REST API callbacks. By default, the object reference 540 is in read-only mode not allowing the user to interact with the object reference display.

Object reference 540 can be loaded in a variety of ways into the visual collaboration software 110. For example, the visual collaboration software 110 can load all object references 540 within a workspace 550 when the workspace loads, even if not all object references are in view of the user. When an object 545 that is out of the current view of the user receives an update, the visual collaboration software 110 can display to the user in their current view a message that an update was made out of view, and a banner of the update. Once an object reference 540 is loaded, the user can see all updates to the object reference in real-time and in can interact with the data contained in the object reference, namely, object 545.

The user can interact with the object reference 540 by using touch, drag, mouse click, mouse drag, to place the cursor, to select portions of the object reference, or to place the object reference 540 in an appropriate location within the canvas 510 or the workspace 550. The user can utilize the keyboard to type information into the object reference 540.

A long press or similar interaction like a double-tap on a touch-sensitive display or mouse click on the object 545 can offer the user the following options:

Open the object 545 in an overlay browser opened by a browser plugin. The overlay browser can solely open the object 545 itself or a copy of the workspace 550 with the size of the window focused on the object reference only.
Open the object 545 in a new web view on a mobile device.
Add a new child canvas if the current object 545 is within a canvas 510 or add a comment to the object reference.
Interact with the object 545 inside the workspace.
Snapshot the current object 545 and create a copy in the closest open workspace area as an image and store as a referenced graphical object.
Record as a video/image the updates to the object 545, stop recording, thus placing the recorded video/image in the closest open workspace area as a referenced graphical object.

Figure 6:
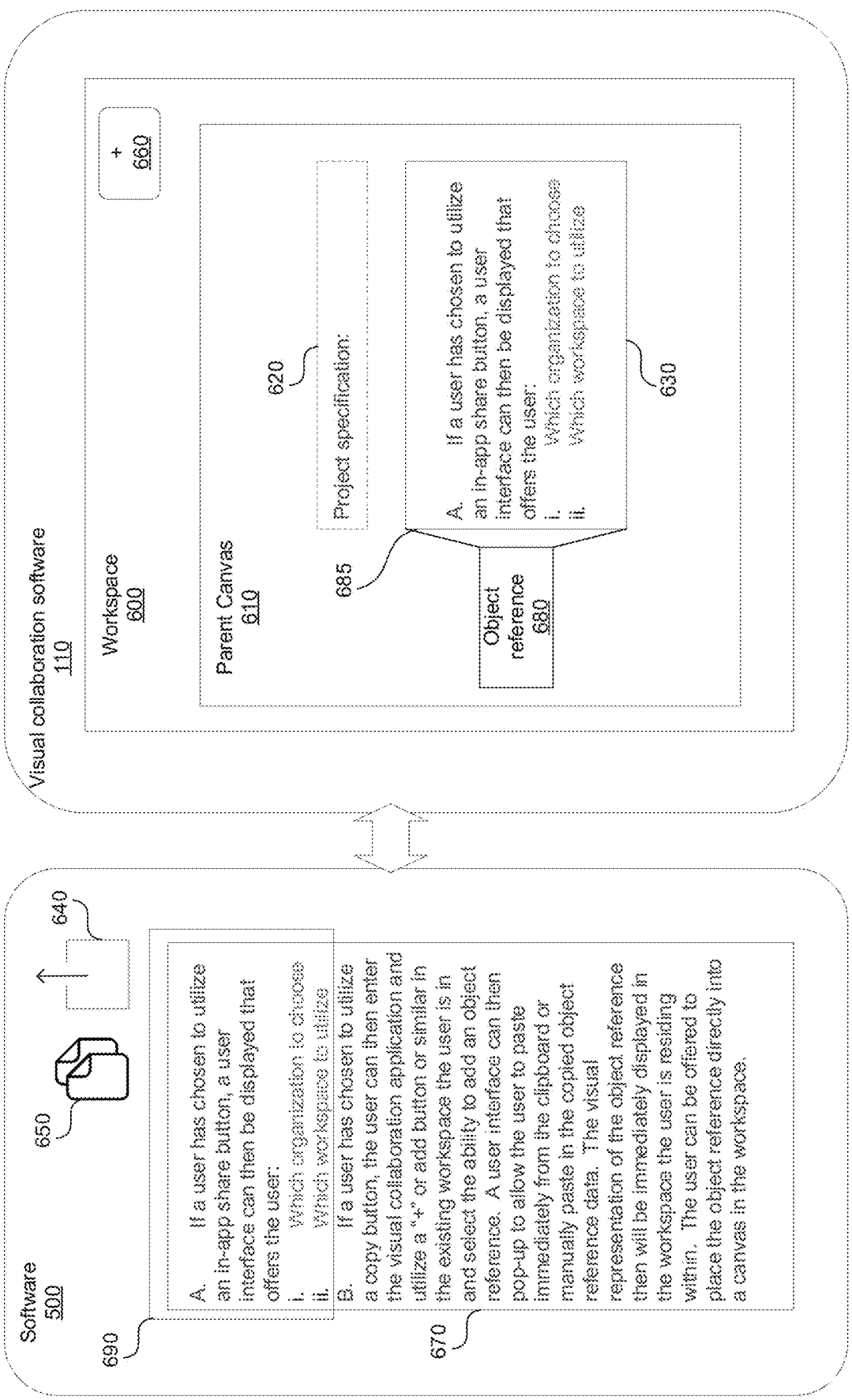
FIG. 6 shows a native document in a second software and an object reference in the visual collaboration software.

FIG. 6 shows a native document in a second software and an object reference in the visual collaboration software. The native document 670 can be a word processing document. The selected portion 690 of the native document 670 can be displayed in a workspace 600 using an object reference 680. The portion 690 referred to by the object reference 680 can be displayed in a canvas 610.

The canvas 610 can have child canvases 620, 630. For example, the child canvas 620 can contain text referring to the object 685 represented by the object reference 680. The child canvas 630 can contain the object 685. When the user interacts with the object 685 represented by the object reference 680, the interaction is passed to the second software 500 in FIG. 5. An update to the object reference 680 by the second software 500 is sent to the visual collaboration software 110.

In one embodiment, to create the object reference 680, the user can single click or press a share button 640 displayed by the second software 500. A second software 500 can make a REST API call to the visual collaboration software 110 to create the object reference 680. The second software 500 and/or the visual collaboration software 110, prior to requesting the creation of the object reference 680 or creating the object reference, respectively, can check whether the object reference already exists. If the object reference already exists, a duplicate is not created, and the existing object reference 680 is utilized. When creating the object reference, the second software 500 can query the user:

Which organization to choose, if the user is a member of greater than one organization in the visual collaboration system.

Which workspace to utilize.

Whether to place the newly created Object Reference near a certain canvas, so the user can find it later.

Whether to place the newly created object in an existing canvas in the workspace.

In another embodiment, to create the object reference 680, the user can single click or press a copy button 650, which copies the portion 690 of the native document 670 to a clipboard. The user can then enter the visual collaboration software 110, utilize a paste button 660 in the existing workspace 600, and add the object reference 680. The visual collaboration software 110 can offer to the user to select the canvas in which to place the object reference 680.

Figure 7:
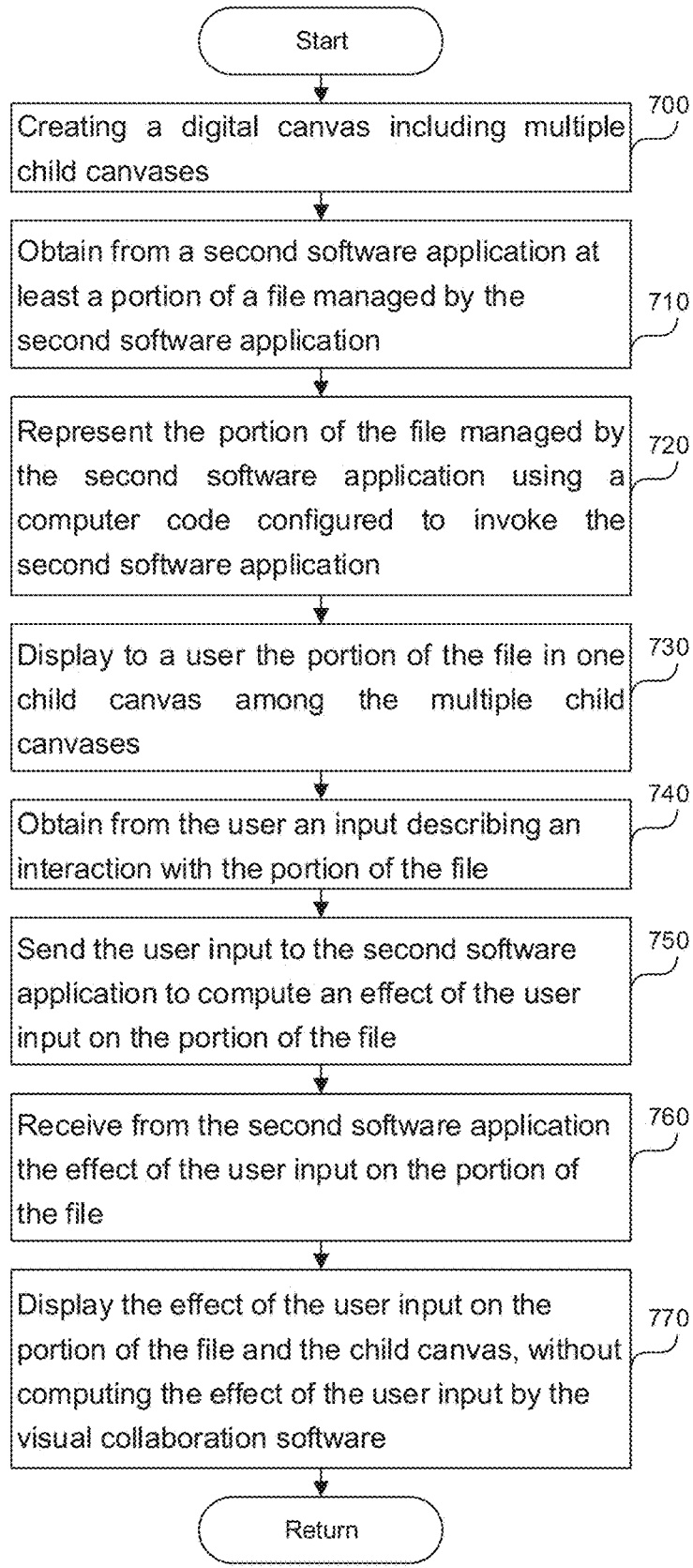
FIG. 7 is a flowchart of a method to embed an object reference into a visual collaboration software.

FIG. 7 is a flowchart of a method to embed an object reference into a visual collaboration software. In step 700, a hardware or software processor, executing instructions of a visual collaboration software, can create a digital canvas including multiple child canvases and multiple tools enabling collaboration among multiple users. Users can create and share information including text, drawings, images, audio, video, geometry, etc.

In step 710, the processor can obtain from a second software at least a portion of a file managed by the second software. The file managed by the second software can be a file native to the second software. For example, the second software can be a spreadsheet, a text file, an image editor, a video editor, a presentation tool, or a videoconferencing tool. The file managed by the second software can be a spreadsheet, a text file, an image, video, a slide deck, etc. The user can select a portion of the file or the whole file in the second software.

For example, if the file is a spreadsheet, the portion of the file can contain one or more cells. If the file is a text file, the portion of the file can contain one or more characters, words, sentences or paragraphs. If the file is a video, a portion of the file can contain a clip of the video. To determine which portion of the file is selected, the processor can determine a smallest selectable element in the file, for example a cell in a spread sheet, a character in a text file, or a clip in a video file. The processor can limit a granularity of the selection to the smallest selectable element in the file. For example, if the file is an image file, and the smallest selectable element is the image, the processor can limit the granularity of the selection to the whole image, regardless of which portion of the image the user selects.

The visual collaboration software does not execute instructions to manipulate the file. In other words, the visual collaboration software does not have the instructions to interact with the file by, for example, editing the spreadsheet, modifying the image, editing the video, creating an audio, etc.

In step 720, the processor can represent the portion of the file managed by the second software using a computer code configured to invoke the second software. The computer code can include an iFrame, a URL, an IPC invocation, JSON code, and/or XML code, as explained in this application. The computer code can also include parameters configured to receive user inputs. The second software can be a cloud software application executed by a remote processor, or the second software can be a process configured to use IPC to communicate with the visual collaboration software.

In step 730, the processor can display to a user the portion of the file in one child canvas among the multiple child canvases. In step 740, the processor can obtain from the user and input describing an interaction with the portion of the file. The interaction can include a modification to the file such as a deletion or addition of elements in the file.

In step 750, the processor can send user input to the second software to compute an effect of the user input on the portion of the file, because the visual collaboration software does not have the instructions to compute the result of the user interaction. To create a communication channel with the second software, the processor can execute the computer code configured to invoke the second software.

In step 760, the processor can receive from the second software the effect of the user input on the portion of the file, after the second software computes the result of the interaction between the user and the portion of the file. For example, if the portion of the file is an image, and the user input is an image crop, the second software can return the cropped image to the visual collaboration software.

In step 770, the processor can display the effect of the user input on the portion of the file in the child canvas, without computing the effect of the user input by the visual collaboration software. For example, the processor can display the cropped image to the user.

When the processor receives the portion of the file, the processor can detect whether a duplicate of the portion of the file is included in the multiple child canvases. If the processor detects that the portion of the file is already represented as an embedded object reference in one of multiple canvases, the processor can create another instance of the embedded object reference in the newly specified canvas. The processor can create a link between the duplicate of the portion of the file and the portion of the file, e.g., by creating a link between the two embedded object references. When the processor receives an update to one of the duplicate or the portion of the file, e.g., to one of the two embedded object references, the processor can update the other object reference based on the link between the two object references.

The processor can obtain from the user a modification to the portion of the file. Based on the modification, the processor can automatically update the portion of the file stored by the visual collaboration software, thus synchronizing the portion of the file shown to the user and the portion of the file stored by the second software.

The processor can create a share button within the second software to enable single-click sharing of the file with the child canvas. The processor can display the share button on a screen of a device, such as a mobile device, a desktop device, a laptop device, and/or a wall device.

Computer

Figure 8:
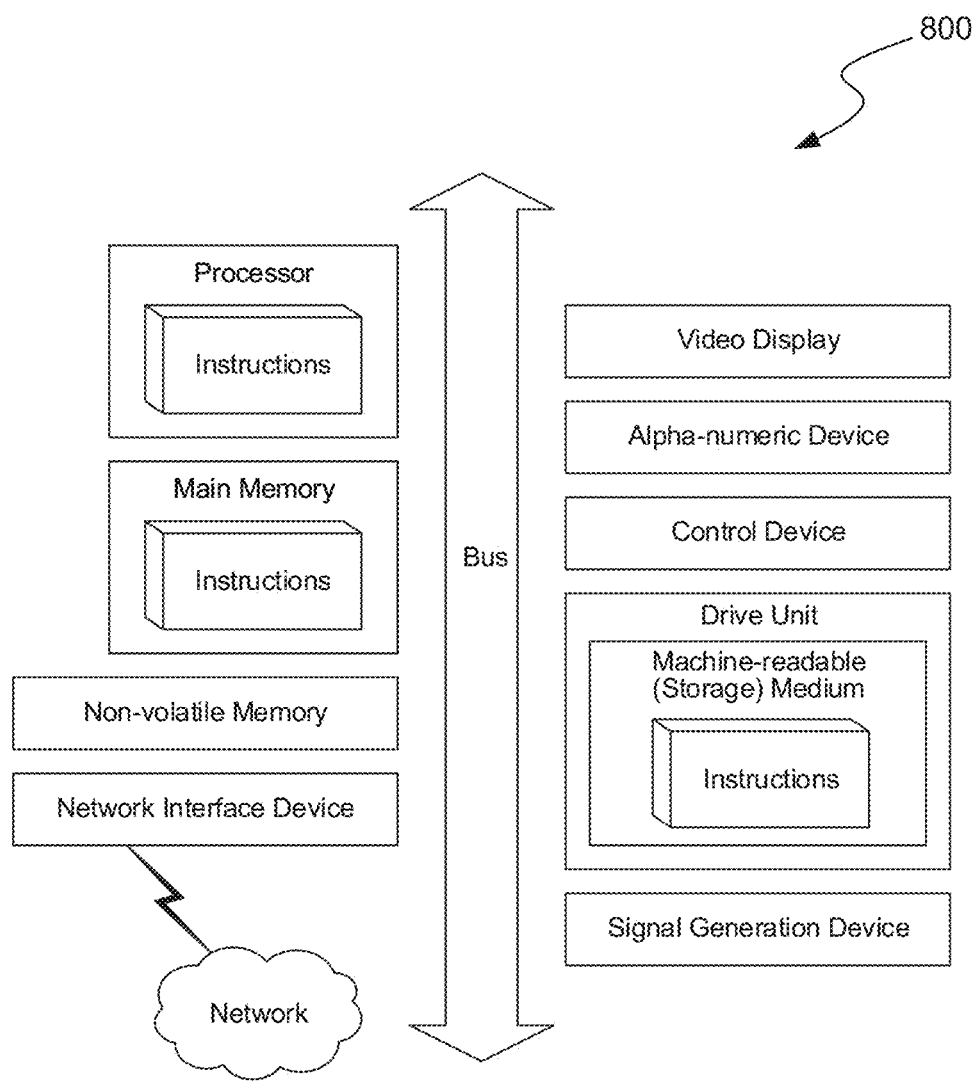
FIG. 8 is a diagrammatic representation of a machine in the example form of a computer system within which a set of instructions, for causing the machine to perform any one or more of the methodologies or modules discussed herein, can be executed.

FIG. 8 is a diagrammatic representation of a machine in the example form of a computer system 800 within which a set of instructions, for causing the machine to perform any one or more of the methodologies or modules discussed herein, can be executed.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components described in the example of FIGS. 1-7 (and any other components described in this specification) can be implemented. The computer system 800 can be of any applicable known or convenient type. The components of the computer system 800 can be coupled together via a bus or through some other known or convenient device.

The processor of the computer system 800 can execute the various instructions described in the specification, such as in FIGS. 4, 7. The processor can execute the instruction of the project management software 100 in FIG. 1, the second software 500 in FIGS. 5, 6, and/or the visual collaboration software 110 in FIGS. 1, 5, 6. The main memory, the nonvolatile memory, and/or the drive unit the computer system 800 can store instructions executed by the processor of the computer system 800. The project management software 100, the second software 500, and the visual collaboration software 110 can communicate with each other using the network of the computer system 800.

This disclosure contemplates the computer system 800 taking any suitable physical form. As example and not by way of limitation, computer system 800 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 can include one or more computer systems 800; be unitary or distributed; span multiple locations; span multiple machines; or reside in a cloud, which can include one or more cloud components in one or more networks. Where appropriate, one or more computer systems 800 can perform without substantial spatial or temporal limitation one or more steps of one or more methods described or illustrated herein. As an example, and not by way of limitation, one or more computer systems 800 can perform in real time or in batch mode one or more steps of one or more methods described or illustrated herein. One or more computer systems 800 can perform at different times or at different locations one or more steps of one or more methods described or illustrated herein, where appropriate.

The processor can be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory cannot even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 800. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the machine and that cause the machine to perform any one or more of the methodologies or modules of the presently disclosed technique and innovation.

In general, the routines executed to implement the embodiments of the disclosure can be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

REMARKS

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for," but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. A computer-implementable method for embedding and interacting with reference objects within a visual collaboration system, the method comprising:
    creating, by visual collaboration software, a digital canvas and multiple tools enabling collaboration among multiple users by enabling creation and sharing of visual information including text and drawings among the multiple users,
        wherein the digital canvas includes multiple child canvases,
        wherein the visual collaboration software stores, in one of the multiple child canvases, a copy of a chart from a first software, and
        wherein the first software includes functionality for planning or measuring progress and tasks in a project;
    obtaining, by the visual collaboration software, from a second software at least a portion of a file managed by the second software,
        wherein the visual collaboration software does not execute instructions to manipulate the portion of the file, and
        wherein the second software includes a word processor, a spreadsheet, an image editing tool, a presentation software, or a video editing software;
    representing, by the visual collaboration software, the portion of the file managed by the second software using a computer code configured to invoke the second software,
        wherein the second software is a cloud software application executed by a remote processor, and
        wherein the computer code includes a URL of the second software and a parameter to receive a user input;
    displaying to a user, by the visual collaboration software, the portion of the file in a child canvas among the multiple child canvases;
    obtaining, by the visual collaboration software from the user among the multiple users, the user input describing an interaction with the portion of the file;
    sending, by the visual collaboration software, the user input to the second software to compute an effect of the user input on the portion of the file,
        wherein the sending the user input includes executing the computer code configured to invoke the second software;
    receiving, by the visual collaboration software, from the second software the effect of the user input on the portion of the file; and
    displaying, by the visual collaboration software, the effect of the user input on the portion of the file in the child canvas, without computing the effect of the user input by the visual collaboration software;
    receiving a modification to the copy of the chart including (i) a change in a schedule of a task among the ordered tasks, and (iii) a drawing associated with the task, and
    in response to receiving the modification, the visual collaboration software updates the copy of the chart and an original copy of the chart stored in the project management software, thereby synchronizing the copy and the original copy of the chart.

2. The method of claim 1, wherein the obtaining, by the visual collaboration software, from the second software at least the portion of the file comprises:
displaying the file to the user;
receiving a selection of the portion of the file from the user;
determining a smallest selectable element in the file; and
limiting a granularity of the selection to the smallest selectable element in the file.

3. The method of claim 1, further comprising:
detecting whether a duplicate of the portion of the file is included in the multiple child canvases;
creating a link between the duplicate of the portion of the file and the portion of the file;
receiving an update to one of the duplicate or the portion of the file; and
upon updating the one of the duplicate or the portion of the file, updating other among the duplicate or the portion of the file based on the link.

4. The method of claim 1, wherein the file comprises a word processing file, a slide presentation file, a spreadsheet file, an image file, or a video file.

5. The method of claim 1, wherein the obtaining, by the visual collaboration software, from the second software at least the portion of the file comprises:
displaying the file to the user; and
receiving a selection of the portion of the file from the user.

6. The method of claim 1, further comprising:
obtaining a modification to the portion of the file; and
based on the modification automatically updating the portion of the file stored by the visual collaboration software,
thereby synchronizing the portion of the file shown to the user and the portion of the file stored by the second software.

7. The method of claim 1, further comprising:
creating a share button within the second software to enable single-click sharing of the portion of the file with the child canvas; and
displaying the share button on a screen of a device.

8. The method of claim 1,
wherein the visual collaboration software communicates with at least the second software across a wireless telecommunication network.

9. A system comprising:
one or more processors;
memory coupled to the one or more processors, wherein the memory includes instructions executable by the one or more processors to:
create, by a visual collaboration software, a digital canvas including multiple child canvases,
wherein the visual collaboration software stores, in one of the multiple child canvases, a copy of a chart from a first software, and
wherein the first software includes functionality for planning or measuring progress and tasks in a project;
obtain, by the visual collaboration software, from a second software at least a portion of a file managed by the second software,
wherein the visual collaboration software does not execute instructions to manipulate the portion of the file;
represent, by the visual collaboration software, the portion of the file managed by the second software using a computer code configured to invoke the second software;
display to a user, by the visual collaboration software, the portion of the file in a child canvas among the multiple child canvases;
obtain, by the visual collaboration software from the user among multiple users, a user input describing an interaction with the portion of the file;
send, by the visual collaboration software, the user input to the second software to compute an effect of the user input on the portion of the file,
wherein the sending the user input includes executing the computer code configured to invoke the second software;
receive, by the visual collaboration software, from the second software the effect of the user input on the portion of the file; and
display, by the visual collaboration software, the effect of the user input on the portion of the file in the child canvas, without computing the effect of the user input by the visual collaboration software
wherein the instructions to obtain, by the visual collaboration software, from the second software at least the portion of the file comprise the instructions to:
display the file to the user;
receive a selection of the portion of the file from the user;
determine a smallest selectable element in the file; and
limit a granularity of the selection to the smallest selectable element in the file, so that when the file is an image file, granularity of the selection is to a whole image, regardless of which portion of the image the user selects, and
wherein the visual collaboration software does not execute instructions to manipulate the file.

10. The system of claim 9, wherein the computer code includes a URL of the second software and a parameter to receive the user input, and wherein the computer code includes inter-process communication between the visual collaboration software and the second software.

11. The system of claim 9, wherein the instructions to obtain, by the visual collaboration software, from the second software at least the portion of the file comprise the instructions to:
display the file to the user; and
receive a selection of the portion of the file from the user.

12. The system of claim 9, further comprising the instructions to:
detect whether a duplicate of the portion of the file is included in the multiple child canvases;
create a link between the duplicate of the portion of the file and the portion of the file;
receive an update to one of the duplicate or the portion of the file; and
upon updating the one of the duplicate or the portion of the file, update the other among the duplicate or the portion of the file based on the link.

13. The system of claim 9, further comprising the instructions to:
   obtain, from the user a modification to the portion of the file; and
   based on the modification automatically update the portion of the file stored by the visual collaboration software,
      thereby synchronizing the portion of the file shown to the user and the portion of the file stored by the second software.

14. The system of claim 9, further comprising the instructions to:
   create a share button within the second software to enable single-click sharing of the portion of the file with the child canvas; and
   display the share button on a screen of a device.

15. At least one non-transitory, computer-readable medium, carrying instructions, which when executed by at least one data processor, performs a method comprising:
   creating, by a visual collaboration software, a digital canvas including multiple child canvases,
      wherein the visual collaboration software stores, in one of the multiple child canvases, a copy of a chart from a first software, and
      wherein the first software includes functionality for planning or measuring progress and tasks in a project;
   obtaining, by the visual collaboration software, from a second software at least a portion of a file managed by the second software,
      wherein the visual collaboration software does not execute instructions to manipulate the portion of the file;
   representing, by the visual collaboration software, the portion of the file managed by the second software using a computer code configured to invoke the second software;
   displaying to a user, by the visual collaboration software, the portion of the file in a child canvas among the multiple child canvases;
   obtaining, by the visual collaboration software from the user among multiple users, a user input describing an interaction with the portion of the file;
   sending, by the visual collaboration software, the user input to the second software to compute an effect of the user input on the portion of the file,
      wherein the sending the user input includes executing the computer code configured to invoke the second software;
   receiving, by the visual collaboration software, from the second software the effect of the user input on the portion of the file; and
   displaying, by the visual collaboration software, the effect of the user input on the portion of the file in the child canvas, without computing the effect of the user input by the visual collaboration software
   wherein the instructions to obtain, by the visual collaboration software, from the second software at least the portion of the file comprise the instructions to:
      display the file to the user;
      receive a selection of the portion of the file from the user;
      determine a smallest selectable element in the file; and
      limit a granularity of the selection to the smallest selectable element in the file, so that when the file is an image file, granularity of the selection is to a whole image, regardless of which portion of the image the user selects, and
   wherein the visual collaboration software does not execute instructions to manipulate the file.

16. The non-transitory, computer-readable medium of claim 15, wherein the computer code includes a URL of the second software and a parameter to receive the user input, and wherein the computer code includes inter-process communication between the visual collaboration software and the second software.

17. The non-transitory, computer-readable medium of claim 15, wherein the instructions to obtain, by the visual collaboration software, from the second software at least the portion of the file comprise the instructions for:
   displaying the file to the user; and
   receiving a selection of the portion of the file from the user.

18. The non-transitory, computer-readable medium of claim 15, further comprising the instructions for:
   detecting whether a duplicate of the portion of the file is included in the multiple child canvases;
   creating a link between the duplicate of the portion of the file and the portion of the file;
   receiving an update to one of the duplicate or the portion of the file; and
   upon updating the one of the duplicate or the portion of the file, updating the other among the duplicate or the portion of the file based on the link.

19. The non-transitory, computer-readable medium of claim 15, further comprising the instructions for:
   obtaining, from the user a modification to the portion of the file; and
   based on the modification, automatically updating the portion of the file stored by the visual collaboration software,
      thereby synchronizing the portion of the file shown to the user and the portion of the file stored by the second software.

20. The non-transitory, computer-readable medium of claim 15, further comprising the instructions for:
   creating a share button within the second software to enable single-click sharing of the portion of the file with the child canvas; and
   displaying the share button on a screen of a device.

* * * * *